US012631725B2

(12) United States Patent
Choi et al.

(10) Patent No.: US 12,631,725 B2
(45) Date of Patent: May 19, 2026

(54) PASSENGER DETECTION RADAR SYSTEM AND BLOCKAGE DETECTION METHOD THEREFOR

(71) Applicant: Digital Edge Inc., Anyang-si (KR)

(72) Inventors: Soo Ho Choi, Seongnam-si (KR); Hee Jin Yang, Seoul (KR)

(73) Assignee: Digital Edge Inc., Anyang-si (KR)

( * ) Notice: Subject to any disclaimer, the term of this patent is extended or adjusted under 35 U.S.C. 154(b) by 264 days.

(21) Appl. No.: 18/673,355

(22) Filed: May 24, 2024

(65) Prior Publication Data

US 2025/0076461 A1    Mar. 6, 2025

(30) Foreign Application Priority Data

Aug. 31, 2023    (KR) ........................ 10-2023-0115286

(51) Int. Cl.
*G01S 7/40*        (2006.01)
*G01S 7/00*        (2006.01)
*G01S 13/56*       (2006.01)

(52) U.S. Cl.
CPC ............ *G01S 7/4039* (2021.05); *G01S 7/003* (2013.01); *G01S 13/56* (2013.01)

(58) Field of Classification Search
CPC ........ G01S 7/4039; G01S 7/003; G01S 13/56; G01S 13/931
See application file for complete search history.

(56) References Cited

U.S. PATENT DOCUMENTS

| | | | |
|---|---|---|---|
| 2015/0338505 A1* | 11/2015 | Oshima ................... | G01S 13/66 |
| | | | 342/107 |
| 2016/0284213 A1* | 9/2016 | Cao ........................ | G01S 13/584 |
| 2017/0059695 A1* | 3/2017 | Fetterman ............. | G01S 13/931 |
| 2024/0053463 A1* | 2/2024 | Ni ........................... | G01S 13/62 |

FOREIGN PATENT DOCUMENTS

| | | |
|---|---|---|
| KR | 10-1505044 B1 | 3/2015 |
| KR | 10-1513878 B1 | 4/2015 |

* cited by examiner

*Primary Examiner* — William Kelleher
*Assistant Examiner* — Kenneth W Good
(74) *Attorney, Agent, or Firm* — NKL LAW; Jae Youn Kim

(57) ABSTRACT

Provided are a passenger detection radar system and a blockage detection method therefor. The passenger detection radar system includes: a signal processing unit for receiving ADC data, which is received through radar reception channels, and performing signal processing; an RDM data unit for generating and storing RDM data based on a signal subjected to the signal processing; a first detection unit for detecting NPR blockage based on an NPR by detecting a zero Doppler signal in which a Doppler frequency has a value of zero; a second detection unit for detecting power blockage by detecting a power of the zero Doppler signal; and a blockage determination unit for making a final determination whether blockage has occurred based on detection results of the first and second detection units, and generating a control signal to generate a warning alarm upon determining presence of the blockage.

14 Claims, 16 Drawing Sheets

PASSENGER DETECTION RADAR SYSTEM AND BLOCKAGE DETECTION METHOD THEREFOR

BACKGROUND OF THE INVENTION

1. Field of the Invention

The present invention relates to a passenger detection radar system, and more particularly, to a passenger detection radar system and a blockage detection method therefor, capable of detecting a living thing, that is, an adult or child passenger or a pet, present in an interior space of a vehicle by using a radar sensor, and detecting blockage that interfere with the detection of the living thing.

2. Description of the Related Art

A radar sensor refers to a detection device for measuring distance, speed, and angle information by transmitting microwaves and receiving some reflection signals reflected from a target.

Recently, radar sensors are being applied to vehicles in order to prevent collisions upon traveling and support safe driving.

The present applicant has disclosed, filed, and registered a plurality of patents, including Patent Document 1 and Patent Document 2 below, on a radar sensor technology.

Meanwhile, recently, a technology for detecting vital signal information by using a radar sensor is being developed.

In general, a vital signal measurement device according to the related art detects a respiration rate or a heart rate by using a contact-type sensor.

However, a technology for detecting a vital signal by using a radar sensor in a case where it is difficult to use a contact-type sensor, such as a burn patient or an infant, is being developed.

In other words, since a respiration signal and a heart rate signal among vital signals have periodicity, periodic signal characteristics of the vital signals may be detected by using a radar sensor that uses radio waves, such as a frequency-modulated continuous wave (FMCW), continuous wave (CW), pulse, or ultra-wideband (UWB) radar, to measure a respiration rate and a heart rate.

As described above, the radar sensor basically detects a target and detects vital signal information based on Doppler frequency characteristics of vital signals including respiration and heart rates.

Meanwhile, recently, in order to prevent heatstroke of a child left unattended in a car, child presence detection (CPD), which is a function of detecting a child left unattended in a car, is being put into practical use.

In particular, Euro NCAP, which is in charge of car assessment in Europe, has strictly stipulated assessment criteria to mount a sensor capable of directly detecting a child left unattended in a car, starting from 2025.

A radar sensor according to the related art generates an alarm when a living thing is present within a specific range of distance, speed, and angle.

Meanwhile, various components such as a seat or a console may be fixedly installed inside a vehicle, and an interior environment may be changed by modifying an inside of the vehicle through additional installation of a soundproofing facility, audio equipment, a shock complement, and the like to resolve noise or alleviate an interior shock, so that new obstacles or blocking (hereinafter referred to as "blockage") may occur in the radar sensor mounted in an interior of the vehicle.

As described above, when blockage occurs inside a vehicle due to a change in the interior environment, a radar signal may be received such that radio waves are reflected by the blockage.

Accordingly, the radar sensor according to the related art may not detect a target, that is, a stationary target fixedly installed inside a vehicle and a target present inside the vehicle, present on a rear side of the blockage, or may have a reduced target detection rate.

Therefore, there is a need for development of a technology capable of detecting blockage inside a vehicle, which interferes with transmission and reception of a radar signal for detecting a target, to prevent a target detection error caused by the blockage that has occurred by a change in an interior environment, and notifying a driver of a blockage state to take necessary actions.

DOCUMENTS OF RELATED ART

Patent Documents (Patent Document 1) Korean Patent Registration No. 10-1513878 (published on Apr. 22, 2015)
(Patent Document 2) Korean Patent Registration No. 10-1505044 (published on Mar. 24, 2015)

SUMMARY OF THE INVENTION

To solve the problems described above, an object of the present invention is to provide a passenger detection radar system and a blockage detection method therefor, capable of detecting a living thing, that is, an adult or child passenger or a pet, present in an interior space of a vehicle by using a radar sensor, and detecting blockage that interferes with propagation of microwaves due to a change in an interior environment. Another object of the present invention is to provide a passenger detection radar system and a blockage detection method therefor, capable of generating an alarm to prevent a target detection error when blockage is detected in an interior of a vehicle, and notifying a driver of a blockage state to take appropriate actions.

To achieve the objects described above, according to the present invention, there is provided a passenger detection radar system for detecting a passenger by transmitting a radar signal toward a detection target and receiving a reception signal reflected from the detection target, the passenger detection radar system including: a signal processing unit for receiving ADC data, which is received through radar reception channels, and performing signal processing; a range Doppler map (hereinafter referred to as "RDM") data unit for generating and storing RDM data based on a signal subjected to the signal processing; a first detection unit for detecting normalized power rate (hereinafter referred to as "NPR") blockage based on an NPR by detecting a zero Doppler signal in which a Doppler frequency has a value of zero; a second detection unit for detecting power blockage by detecting a power of the zero Doppler signal; and a blockage determination unit for making a final determination whether blockage has occurred based on detection results of the first and second detection units, and generating a control signal to generate a warning alarm upon determining presence of the blockage.

In addition, to achieve the objects described above, according to the present invention, there is provided a blockage detection method for a passenger detection radar system for detecting a passenger by transmitting a radar signal toward a detection target and receiving a reception signal reflected from the detection target, the blockage detection method including: (a) receiving, by a signal processing unit, ADC data, which is received through radar reception channels, and performing signal processing; (b) generating and storing, by a range Doppler map (hereinafter referred to as "RDM") data unit, RDM data subjected to the signal processing; (c) detecting, by a first detection unit, normalized power rate (hereinafter referred to as "NPR") blockage based on an NPR by detecting a zero Doppler signal in which a Doppler frequency has a value of zero; (d) detecting, by a second detection unit, power blockage by detecting a power of the zero Doppler signal; and (e) making, by a blockage determination unit, a final determination whether blockage has occurred based on detection results of the first and second detection units, and generating a warning alarm upon determining presence of the blockage.

As described above, according to a passenger detection radar system and a blockage detection method therefor of the present invention, blockage that interferes with propagation of a radar signal for passenger detection can be detected to generate a warning alarm, so that a driver can take appropriate actions.

In addition, according to the present invention, presence or absence of the blockage can be detected based on a normalized power rate characteristic for zero Doppler data, a power value for a specific near range region can be detected, and a power characteristic of the specific near range region can be used to detect whether the blockage has occurred, so that a blockage detection error can be reduced.

Accordingly, according to the present invention, accuracy of a blockage detection result can be improved, a passenger detection error caused by the blockage can be prevented, and ultimately, a passenger detection rate can be improved.

DETAILED DESCRIPTION OF THE INVENTION

Hereinafter, a passenger detection radar system and a blockage detection method therefor according to an exemplary embodiment of the present invention will be described in detail with reference to the accompanying drawings.

Figure 1:
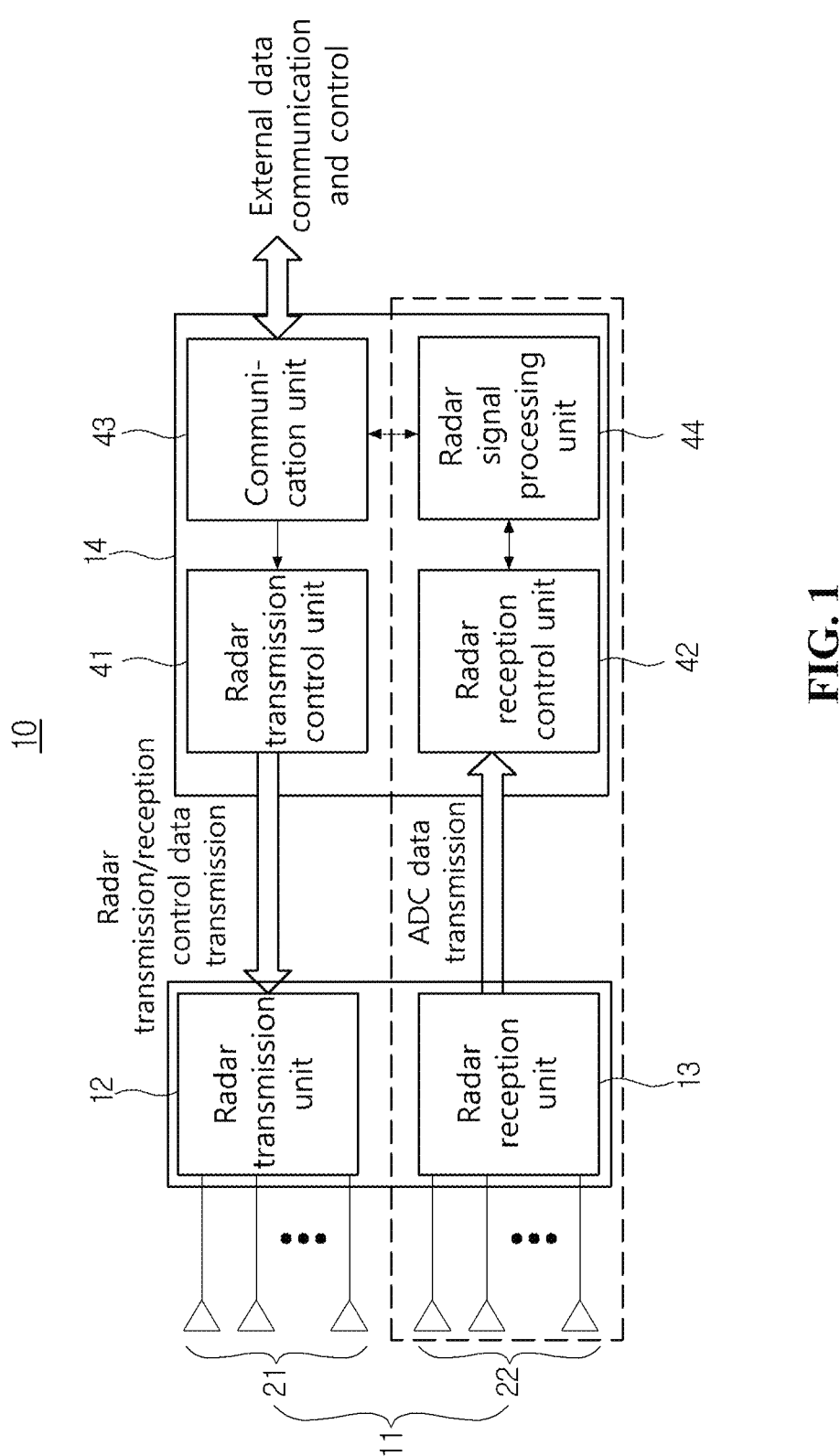
FIG. 1 is a view showing a configuration of a passenger detection radar system according to an exemplary embodiment of the present invention.
Figure 2:
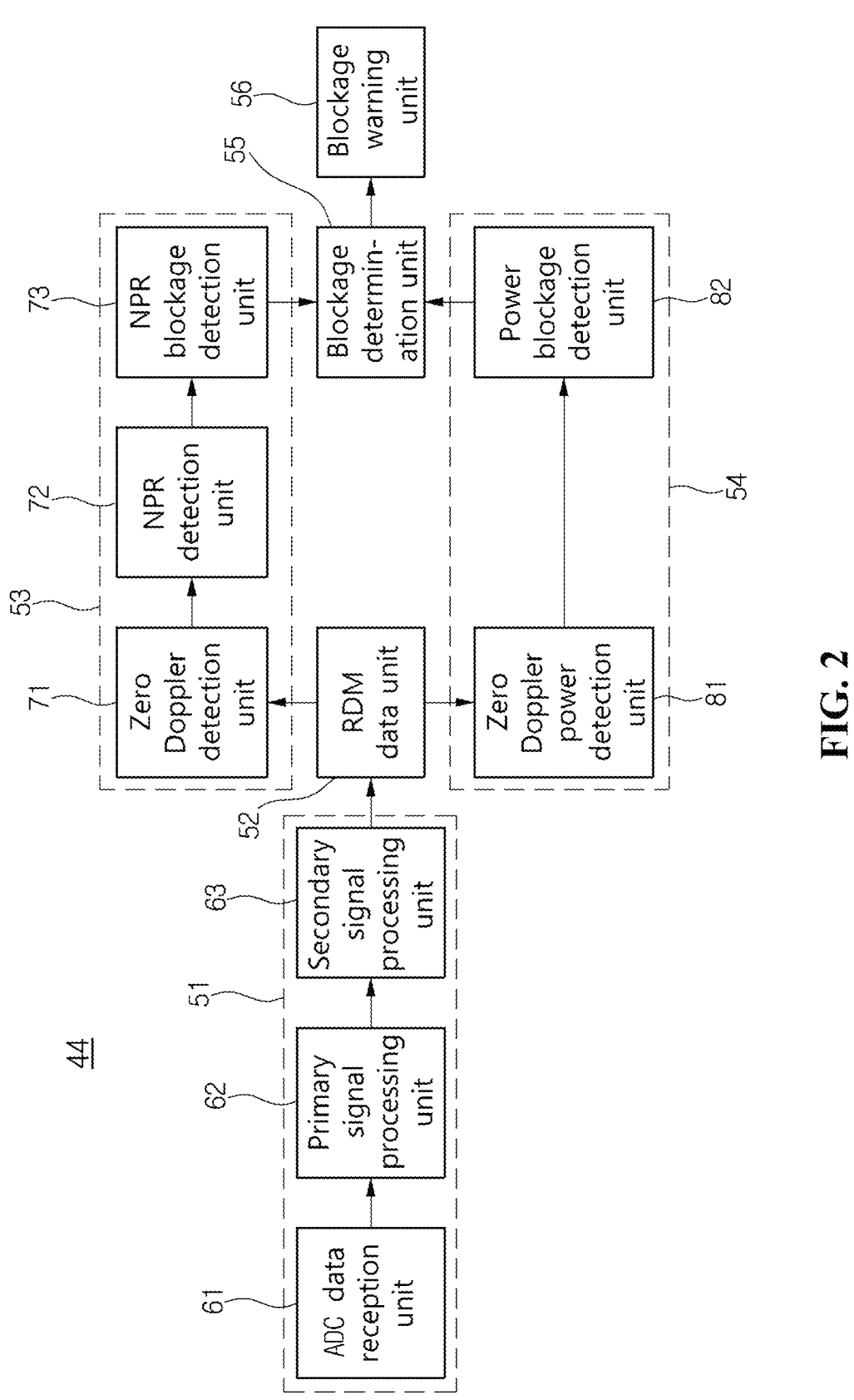
FIG. 2 is a view showing a detailed configuration of a signal processing processor shown in FIG. 1.

FIG. 1 is a view showing a configuration of a passenger detection radar system according to an exemplary embodiment of the present invention, and FIG. 2 is a view showing a detailed configuration of a signal processing processor shown in FIG. 1.

In general, a passenger detection radar system 10 has to be able to detect a child sleeping in an interior of a vehicle, the passenger detection radar system 10 may detect a target, focusing on a moving object, based on macro Doppler characteristics for detecting a motion of the target and micro Doppler characteristics for detecting a vital signal.

The passenger detection radar system 10 may be mainly mounted at a top of the interior of the vehicle, such as a ceiling of a second row of seats, both sides, and a front room mirror, in an embedded manner.

Therefore, a radar sensor according to the related art may apply a moving target indication (hereinafter referred to as "MTI") filter to remove an unnecessary interior stationary target inside the vehicle, for example, a stationary object such as a seat or a console inside the vehicle, a bag, a luggage, or the like.

Since blockage present inside the vehicle has the same characteristics as the interior stationary target, blockage signal characteristics may be removed when the MTI filter or a DC removal filter is used.

However, since the passenger detection radar system 10 according to the present invention detects a micro Doppler frequency of several Hz, a pulse repetition interval (PRI) of a radar waveform may be long.

Meanwhile, since the blockage has to be detected at a high speed, it may be difficult to apply the MTI filter or the DC removal filter to the radar system, and a radar waveform for macro Doppler detection having a short PRI has to be used.

Accordingly, according to the present embodiment, a normalized power rate (NPR) characteristic may be detected for detected zero Doppler data to detect presence or absence of the blockage based on the NPR characteristic for a specific near range region.

In addition, according to the present embodiment, the NPR characteristic may be detected while a power value for the specific near range region is detected, and a power characteristic for the specific near range region may be used to detect the presence or absence of the blockage.

In detail, as shown in FIG. 1, the passenger detection radar system 10 according to an exemplary embodiment of the present invention may include: an antenna unit 11 for transmitting a radar signal (hereinafter referred to as "transmission signal") toward a detection target, and receiving a reception signal reflected from the detection target; a radar transmission unit 12 for generating the transmission signal; a radar reception unit 13 for processing data of the reception signal received through a reception antenna 22; and a signal processing processor 14 for generating a control signal to generate the transmission signal, and performing signal processing on the reception signal to detect vital signal information.

The signal processing processor 14 may detect the blockage included in the reception signal.

The passenger detection radar system 10 configured as described above may be applied to various radar devices that use various frequency bands such as 24 GHz, 60 GHz, 77 GHz, and 79 GHz.

The antenna unit 11 may include a transmission antenna 21 for transmitting the transmission signal, and a reception antenna 22 for receiving the reception signal.

The radar transmission unit 12 may output the transmission signal of a desired oscillation frequency according to the control signal of the signal processing processor 14, and the radar reception unit 13 may amplify the received reception signal and process the data of the reception signal.

The signal processing processor 14 may include: a radar transmission control unit 41 for controlling an operation of the radar transmission unit 12; a radar reception control unit 42 for controlling an operation of the radar reception unit 13; a communication unit 43 for communicating with a device provided outside the vehicle or the radar system 10; and a radar signal processing unit 44 for detecting the vital signal information through signal processing of a detected vital signal.

The radar transmission control unit 41 may generate a control signal to adjust a radar waveform and a transmission power (Tx power) of the transmission signal.

The radar reception control unit 42 may generate a control signal to adjust a reception gain (Rx gain) of the reception signal and adjust a band-pass filter.

The radar reception control unit 42 may include an analog-to-digital converter (hereinafter referred to as "ADC") for converting the reception signal (Rx) in the form of an analog signal into a digital signal.

In other words, the radar reception control unit 42 may include a plurality of ADCs corresponding to the number of reception antennas 22, and the ADCs may perform ADC processing on the reception signals received through the reception antennas 22, respectively.

Meanwhile, a radar sensor may detect 4D data by detecting a distance to the target, a speed of the target, and angle information including azimuth and altitude information.

A respiration signal may include inhalation and exhalation, and may have a periodic characteristic. In addition, a respiration signal of a child may have a relatively small characteristic as compared with a respiration signal of an adult.

Therefore, the radar sensor may detect the 4D data by detecting a vital signal having a periodic characteristic, such as a respiration signal.

The passenger detection radar system 10 according to the present invention may generate a living thing presence detection alarm when a living thing is present within a specific range of distance, speed, and angle.

Hereinafter, the description of a configuration for processing a radar signal to detect a moving target corresponding to a living thing will be omitted, and the description will focus on a configuration for detecting blockage due to a change in an interior environment of a vehicle.

In other words, according to the present embodiment, as shown in FIG. 2, in order to detect the blockage included in the reception signal, the radar signal processing unit 44 may include: a signal processing unit 51 for receiving ADC data, and performing signal processing; a range Doppler map (RDM) data unit 52 for generating RDM data based on a signal subjected to the signal processing; a first detection unit 53 for detecting NPR blockage by detecting a zero Doppler signal in which a Doppler frequency has a value of zero (0); a second detection unit 54 for detecting power blockage by detecting a power of the zero Doppler signal; and a blockage determination unit 55 for making a final determination whether blockage has occurred based on detection results of the first and second detection units 53 and 54, and generating a control signal to generate a warning alarm upon determining presence of the blockage.

In addition, the radar signal processing unit 44 may further include a blockage warning unit 56 for outputting a blockage warning alarm according to the control signal of the determination unit 55.

Meanwhile, instead of providing the blockage warning unit 56, the present invention may be modified to allow the communication unit 43 to communicate with a control module (not shown) provided in the vehicle, and transmit blockage detection result information to the control module to output a blockage warning alarm through a display, a speaker, and the like provided in the vehicle.

In other words, the communication unit 43 may transmit passenger detection and blockage detection result information to the control module in a wired or wireless communication scheme.

To this end, the communication unit 43 may be connected to the control module of the vehicle in a wired manner to enable CAN communication, or may be provided as a wireless communication module used in various schemes such as Wi-Fi, Bluetooth, or short-range wireless communication.

The signal processing unit 51 may include: an ADC data reception unit 61 for receiving the ADC data from the radar reception control unit 42; a primary signal processing unit 62 for performing primary signal processing on the received ADC data through one-dimensional fast Fourier transform (1D FFT) for a range; and a secondary signal processing unit 63 for performing secondary signal processing on a signal subjected to the primary signal processing through two-dimensional fast Fourier transform (2D FFT) for a range and a Doppler frequency.

Figure 3:
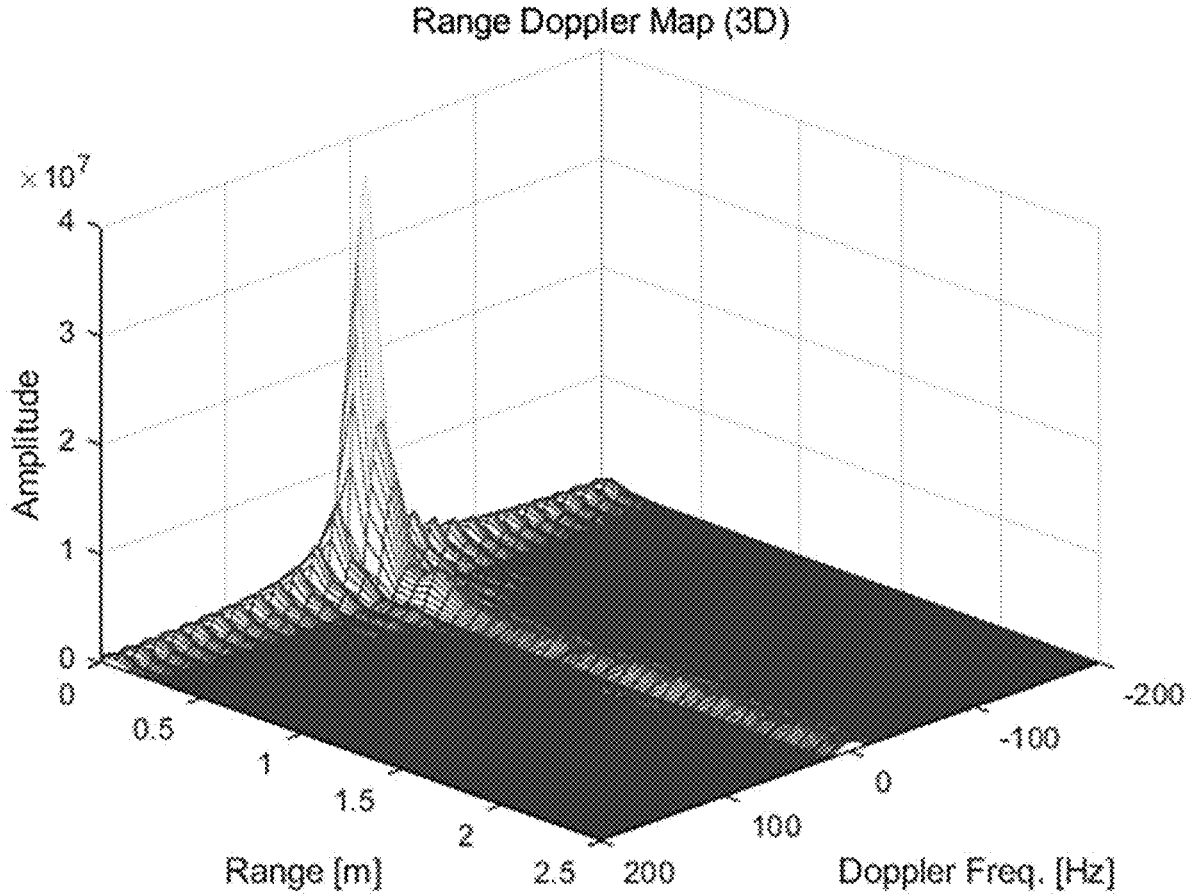
FIG. 3 is a graph for describing RDM data when blockage occurs.
Figure 4:
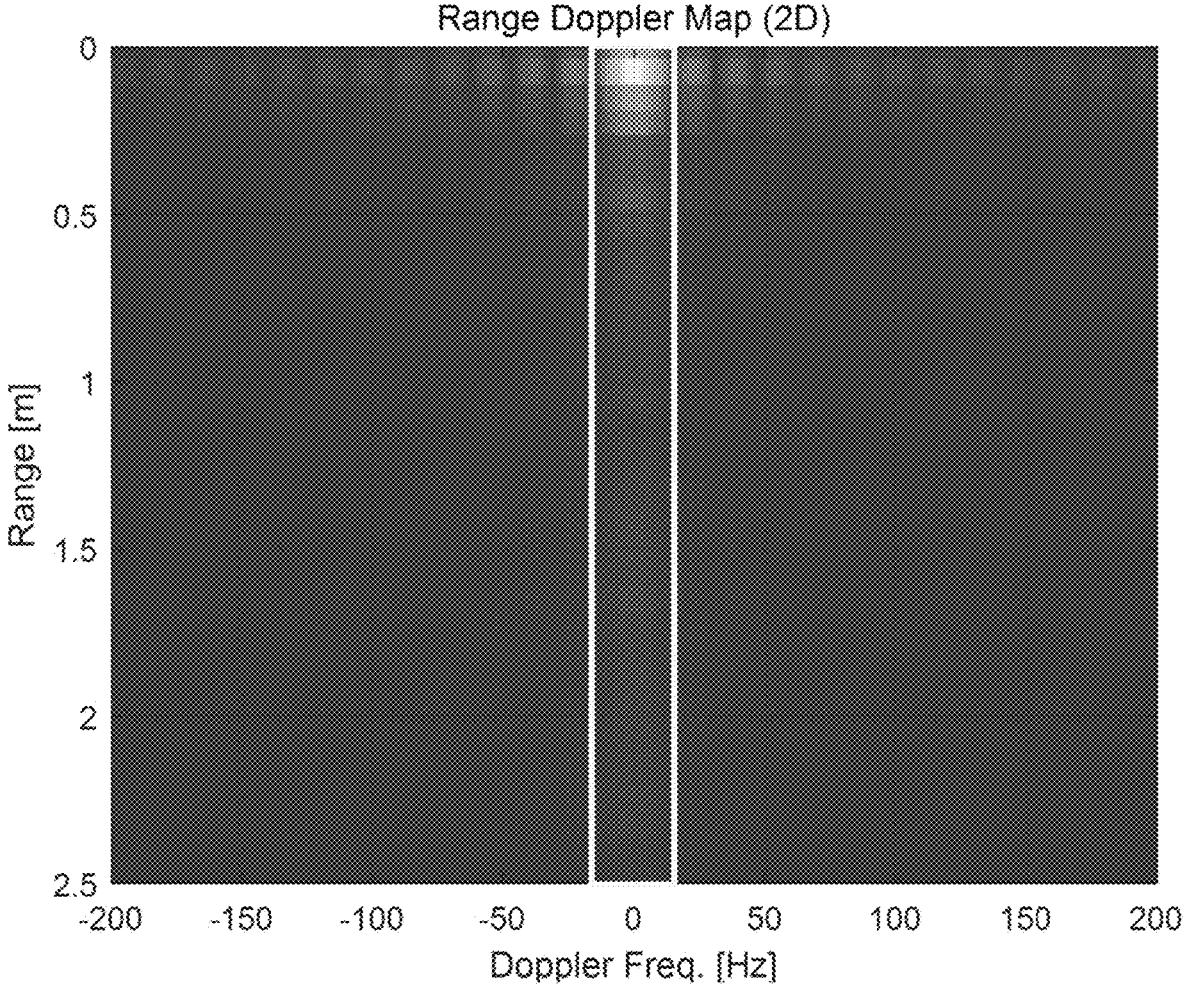
FIG. 4 is a graph for describing two-dimensional data of an RDM shown in FIG. 3.
Figure 5:
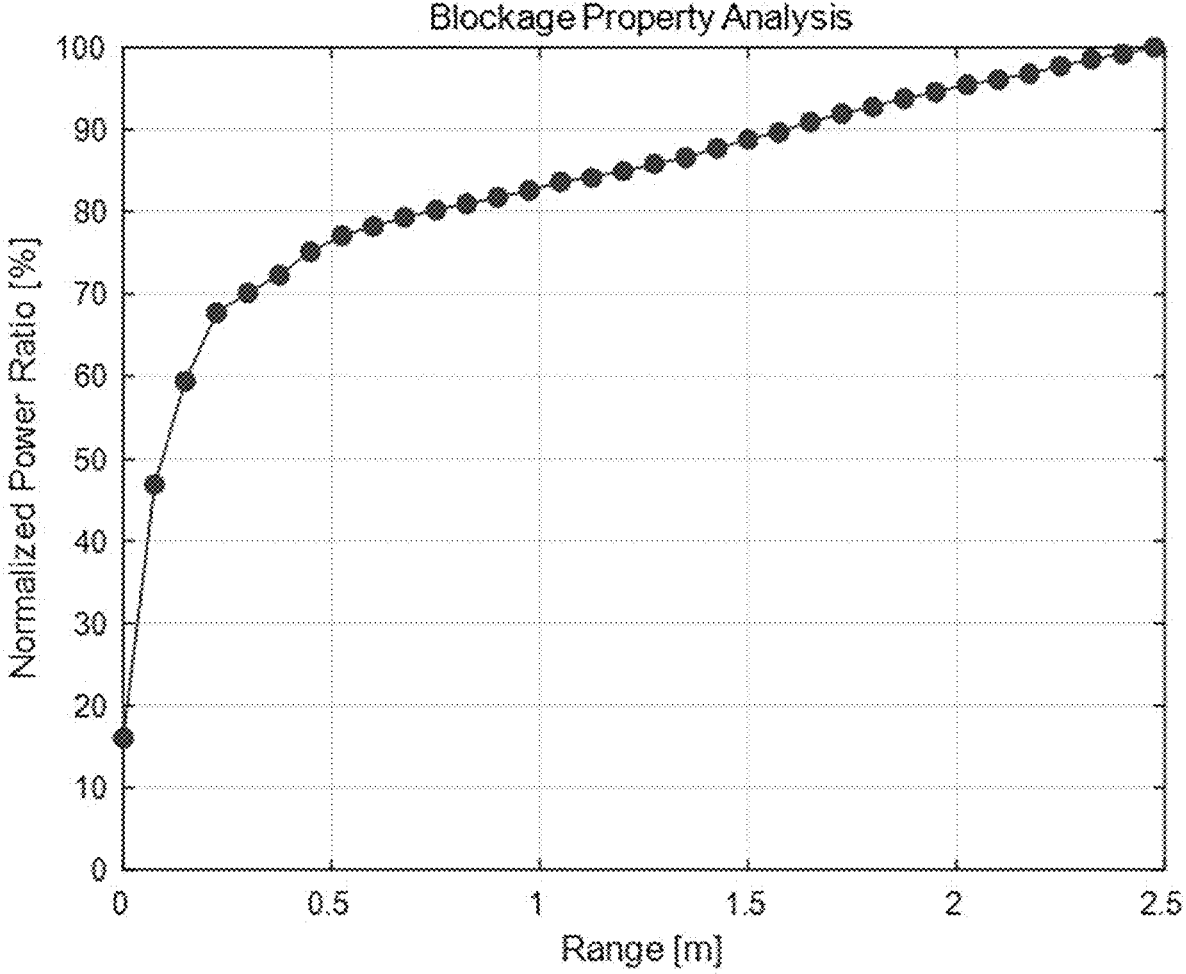
FIG. 5 is a graph showing an analysis result of a blockage value shown in FIG. 3.

FIG. 3 is a graph for describing RDM data when blockage occurs, FIG. 4 is a graph for describing two-dimensional data of an RDM shown in FIG. 3, and FIG. 5 is a graph showing an analysis result of a blockage value shown in FIG. 3.

As shown in FIG. 3, the RDM data unit 52 may generate and store the RDM data from a signal subjected to the secondary signal processing for the range and the Doppler frequency.

A stationary target that is not moving may be detected as a Doppler frequency value of zero (0) Hz.

The RDM data generated through the primary and secondary signal processing may be expressed as R(n,m), where n is a range index, which is 1, 2, . . . , N, and m is a Doppler index, which is 1, 2, . . . , M.

The RDM data may be three-dimensional map data having an amplitude (or magnitude) with a range and a Doppler frequency.

The zero Doppler may include stationary target information, and the blockage may have the same characteristics as the stationary target.

The blockage may occur by an object that is closest to the passenger detection radar system 10, so that target information may be generated at a near range in the antenna unit 11 of the passenger detection radar system 10.

Therefore, the first detection unit 53 may include: a zero Doppler detection unit 71 for detecting a zero Doppler for the RDM data; an NPR detection unit 72 for detecting the NPR based on the detected zero Doppler; and an NPR blockage detection unit 73 for detecting the NPR blockage based on the detected NPR.

In FIG. 4, the zero Doppler detection unit 71 may detect all range bin signals for one index of the zero Doppler, or detect all range bin signals for a frequency index section for a main lobe of the zero Doppler.

The range bin signal detected by the zero Doppler detection unit 71 may be expressed as R(n,k), where n is a range index, which is 1, 2, . . . , N, and a Doppler index (m) may have a value of k, which corresponds to a zero Doppler range bin.

The NPR detection unit 72 may detect a total power ($P_{total}$) for the detected zero Doppler.

The total power detected as described above may be calculated by Mathematical Formula 1 below.

$$P_{total} = \sum_{n=1}^{N} R(n, k)$$ [Mathematical Formula 1]

In addition, the NPR detection unit 72 may detect a sub-power ($P_{sub}$) as each range bin (n) is increased for the detected zero Doppler.

Next, the NPR detection unit 72 may calculate the NPR by using a ratio of the detected total power to the detected sub-power, as shown in Mathematical Formula 2 below.

[Mathematical Formula 2]

$$NPR\,[\%] = \left(\text{Sub-power}/\text{Total power}\right) * 100\,[\%] = \left(P_{sub}/P_{total}\right) * 100\,[\%]$$

The NPR may represent a degree of a variation in a power value for each range bin for the data existing in the zero Doppler. Therefore, when the variation in the power value is large, an NPR value may become large, and when the variation in the power value is small, the NPR value may also become small.

According to the principle of occurrence of the blockage, a foreign substance may be present in a position very close to (in a near range of) the passenger detection radar system 10.

As described above, since a foreign substance is present on a front side of the passenger detection radar system 10, an intensity of the reception signal in which radio waves are reflected from the blockage may be very large.

Due to the presence of the foreign substance, propagation of microwaves may be blocked, so that a target signal present in the interior may not be received.

As shown in FIGS. 3 and 4, a reflection signal caused by the blockage may be combined with a leakage signal generated by the passenger detection radar system 10, so that an intensity of the leakage signal may be increased.

In other words, the leakage signal may include a transmission/reception channel interference signal, a radome reflection signal, a blockage reflection signal, and other signals.

When taking the detected NPR characteristic into consideration, according to an NPR analysis result as shown in FIG. 5, a zero Doppler power of about 70% was concentrated at a range of about 25 cm where an inclination is changed rapidly.

Therefore, the NPR blockage detection unit 73 may analyze the detected NPR characteristic to determine that the blockage has occurred when most of a signal power is concentrated at a near range, that is, at about 25 cm.

To this end, the NPR detection unit 72 may construct a database by storing NPR variation information with respect to a temperature variation in the absence of the blockage in a table.

Therefore, the NPR blockage detection unit 73 may apply the constructed database as a reference, and compare an NPR reference value with the detected NPR at a specific near range to detect the NPR blockage.

The second detection unit 54 may include: a zero Doppler power detection unit 81 for detecting a zero Doppler power for the RDM data; and a power blockage detection unit 82 for detecting the power blockage based on the detected zero Doppler power.

Figure 6:
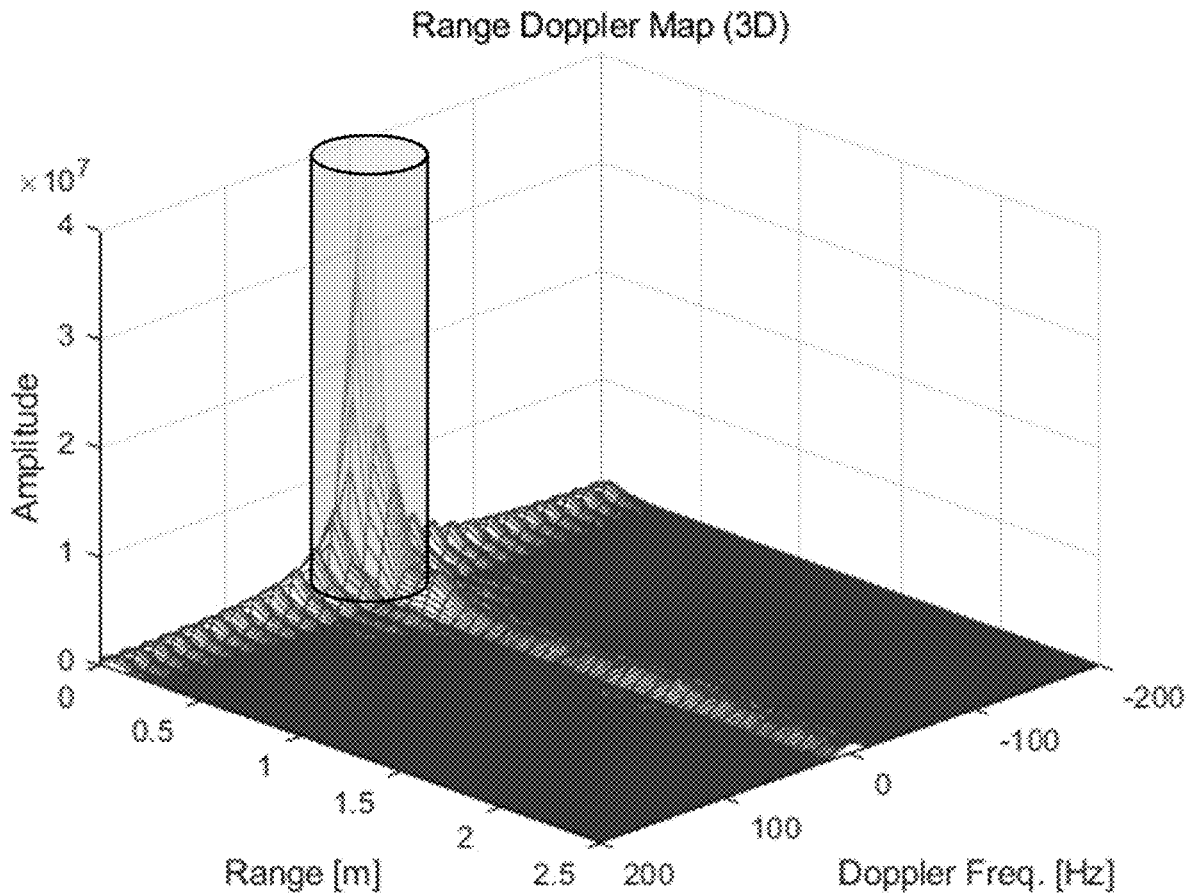
FIG. 6 is a graph showing an analysis result of an RDM characteristic when blockage occurs.
Figure 7:
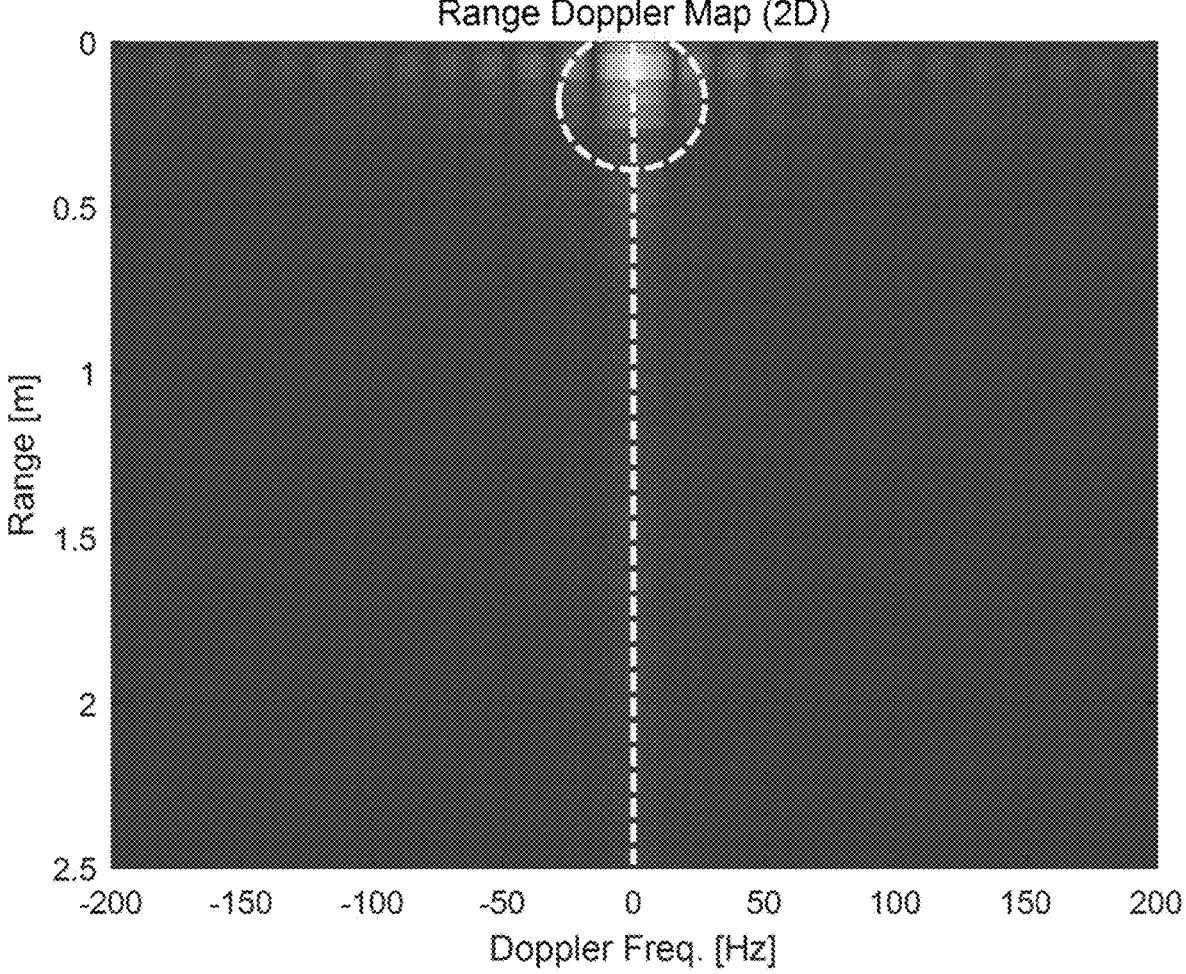
FIG. 7 is a graph showing an analysis result of an RDM power shown in FIG. 6.

FIG. 6 is a graph showing an analysis result of an RDM characteristic when blockage occurs, and FIG. 7 is a graph showing an analysis result of an RDM power shown in FIG. 6.

As shown in FIGS. 6 and 7, when the blockage has occurred, a magnitude may become larger than an existing intensity of the leakage signal.

The zero Doppler power detection unit 81 may measure a power for a specific range and a specific frequency region in the RDM data.

For example, the zero Doppler power detection unit 81 may measure a power of a near range (near range bin) and a main lobe region of the zero Doppler.

Alternatively, the zero Doppler power detection unit 81 may measure a power of a total range (total range bin) and one bin region of the zero Doppler.

The power blockage detection unit 82 may measure a power of the RDM data in the absence of the blockage and apply the power of the RDM data as a leakage signal level reference. In addition, the power blockage detection unit 82 may construct a database by storing leakage signal variation information with respect to a temperature variation in the absence of the blockage in a table.

In addition, the power blockage detection unit 82 may set a blockage power threshold level based on the leakage signal level reference and the leakage signal variation information stored in the table.

Therefore, the power blockage detection unit 82 may compare a power measurement value of the RDM data with the blockage power threshold level, and determine that the blockage has occurred when the power measurement value of the RDM data exceeds the blockage power threshold level.

Accordingly, the blockage determination unit 55 may make the final determination whether the blockage has occurred based on results of determining whether the blockage has occurred by the first and second detection units 53 and 54, and generate the control signal to generate a blockage occurrence warning alarm when determining that the blockage has occurred.

In this case, the blockage determination unit 55 may determine that the blockage has occurred when both the first and second detection units 53 and 54 determine that the blockage has occurred.

Alternatively, the blockage determination unit 55 may determine that the blockage has occurred even when one of the first and second detection units 53 and 54 determines that the blockage has occurred.

As described above, according to the present invention, the blockage that interferes with propagation of a radar signal for passenger detection may be detected to generate the warning alarm.

Next, a blockage detection method for a passenger detection radar system according to an exemplary embodiment of the present invention will be described in detail with reference to FIG. 8.

Figure 8:
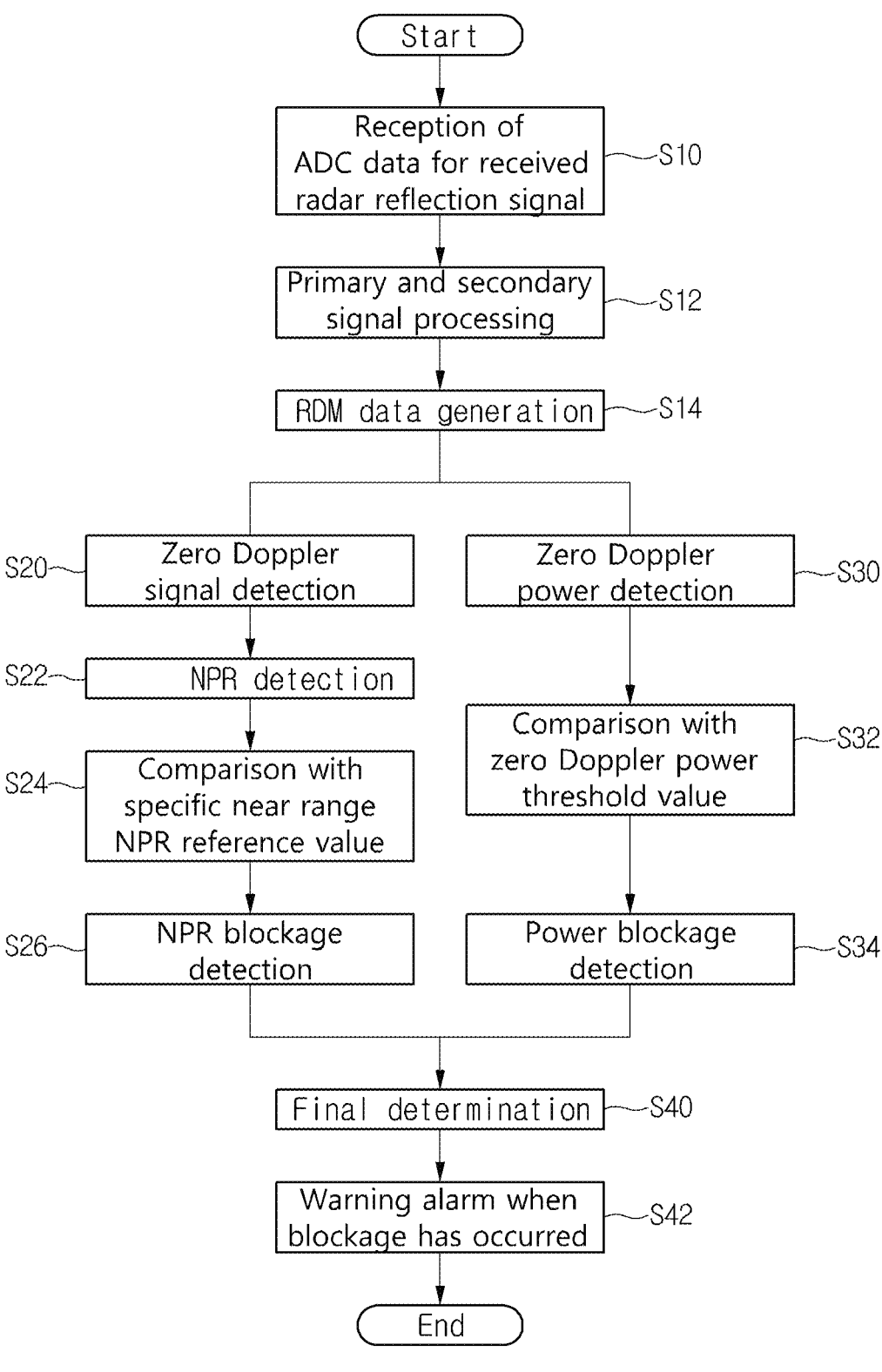
FIG. 8 is a flowchart for describing, step by step, a blockage detection method for a passenger detection radar system according to an exemplary embodiment of the present invention.

FIG. 8 is a flowchart for describing, step by step, a blockage detection method for a passenger detection radar system according to an exemplary embodiment of the present invention.

First, the radar transmission unit 12 may transmit a signal to a vicinity of a detection target, that is, a target from which a vital signal is to be detected, through a transmission antenna 21 according to a control signal of a radar transmission control unit 41 of a signal processing processor 14, and may receive a signal reflected from the detection target through a reception antenna 22.

Then, an ADC provided in the radar reception control unit 42 may convert the reception signal in the form of an analog signal into a digital signal.

In the step S10 of FIG. 8, an ADC data reception unit 61 provided in a signal processing unit 51 may collect ADC data for a received radar reflection signal.

In the step S12, a primary signal processing unit 62 may perform primary signal processing on the received ADC data through 1D FFT for a range, and a secondary signal processing unit 63 may perform secondary signal processing on a signal subjected to the primary signal processing through 2D FFT for a range and a Doppler frequency.

In the step S14, an RDM data unit 52 may generate and store RDM data from a signal subjected to the secondary signal processing for the range and the Doppler frequency Then, the first detection unit 53 and the second detection unit 54 may detect blockage based on the generated RDM data.

First, in the step S20, a zero Doppler detection unit 71 provided in the first detection unit 53 may detect a zero Doppler signal for the RDM data.

In this case, the zero Doppler detection unit 71 may detect all range bin signals for one index of the zero Doppler, or detect all range bin signals for a frequency index section for a main lobe of the zero Doppler.

In the step S22, the NPR detection unit 72 may detect an NPR based on the detected zero Doppler.

In this case, the NPR detection unit 72 may detect a total power ($P_{total}$) for the detected zero Doppler, detect a sub-power (Pub) as each range bin (n) is increased for the detected zero Doppler, and calculate the NPR by using a ratio of the detected total power to the detected sub-power.

In this case, the NPR detection unit 72 may construct a database by storing NPR variation information with respect to a temperature variation in absence of the blockage in a table.

Therefore, the NPR blockage detection unit 73 may apply the constructed database as a reference and compare an NPR reference value with the detected NPR at a specific near range (S24), and may detect NPR blockage by determining that the NPR blockage has occurred when the detected NPR exceeds the NPR reference value as a result of the comparison (S26).

Meanwhile, in the step S30, a zero Doppler power detection unit 81 provided in the second detection unit 54 may detect a zero Doppler power for the RDM data.

In this case, the zero Doppler power detection unit 81 may measure a power for a specific range and a specific frequency region in the RDM data. In other words, the zero Doppler power detection unit 81 may measure a power of a near range (near range bin) and a main lobe region of the zero Doppler, or a power of a total range (total range bin) and one bin region of the zero Doppler.

Therefore, the power blockage detection unit 82 may construct a database by storing leakage signal variation information with respect to a temperature variation in the absence of the blockage in a table to measure a power of the RDM data in the absence of the blockage and apply the power of the RDM data as a leakage signal level reference, and may set a blockage power threshold level based on the leakage signal level reference and the leakage signal variation information stored in the table.

Next, the power blockage detection unit 82 may compare a power measurement value of the RDM data with the blockage power threshold level (S32), and may detect the blockage by determining that the blockage has occurred when the power measurement value of the RDM data exceeds the blockage power threshold level (S34).

In the step S40, the blockage determination unit 55 may make a final determination whether the blockage has occurred based on an NPR blockage detection result and a power blockage detection result of the first and second detection units 53 and 54 in the steps S26 and S34.

In this case, the blockage determination unit 55 may make the final determination that the blockage has occurred when the blockage is detected by both the first and second detection units 53 and 54, or may make the final determination that the blockage has occurred even when the blockage is detected by one of the first and second detection units 53 and 54.

The blockage determination unit 55 may generate a control signal to generate a blockage occurrence warning alarm when determining that the blockage has occurred as a result of the determination in the step S40, and a blockage warning unit 56 may output the blockage occurrence warning alarm to a driver in various schemes such as a text or a sound according to the control signal.

Meanwhile, according to the present invention, blockage occurrence state information may be transmitted to a control module provided in a vehicle through a communication unit, and a blockage warning alarm may be output in various schemes such as a text, a sound, or a message through a display and a speaker provided in the vehicle.

Accordingly, the driver may recognize that the blockage has occurred due to a change in an interior environment inside the vehicle, remove the detected blockage, and perform repair so that a passenger, especially a rear seat passenger, may be precisely detected.

For example, FIGS. 9 to 16 are views illustrating respective test results of detecting variations in an RDM signal characteristic and an NPR due to blockage.

Figure 9:
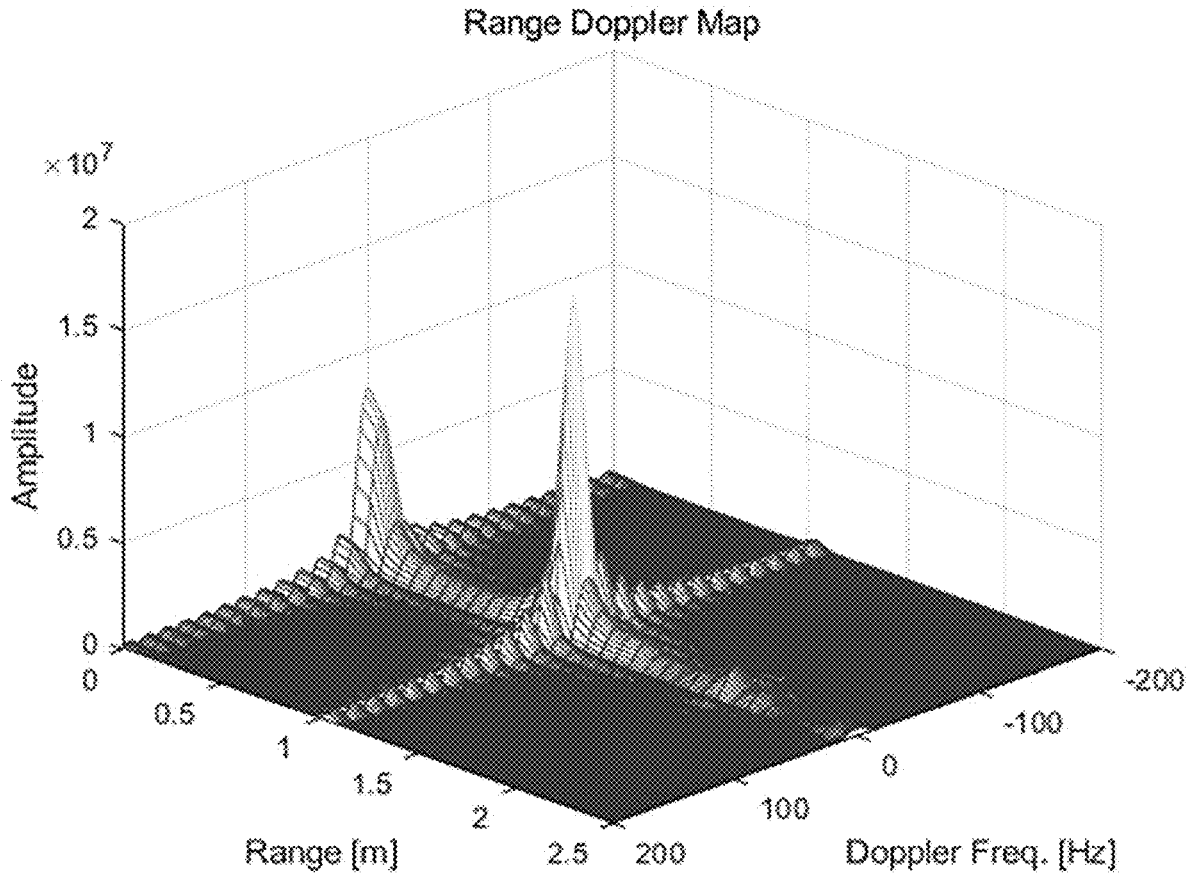
FIGS. 9 to 16 are views illustrating respective test results of detecting variations in an RDM signal characteristic and an NPR due to blockage.
Figure 10:
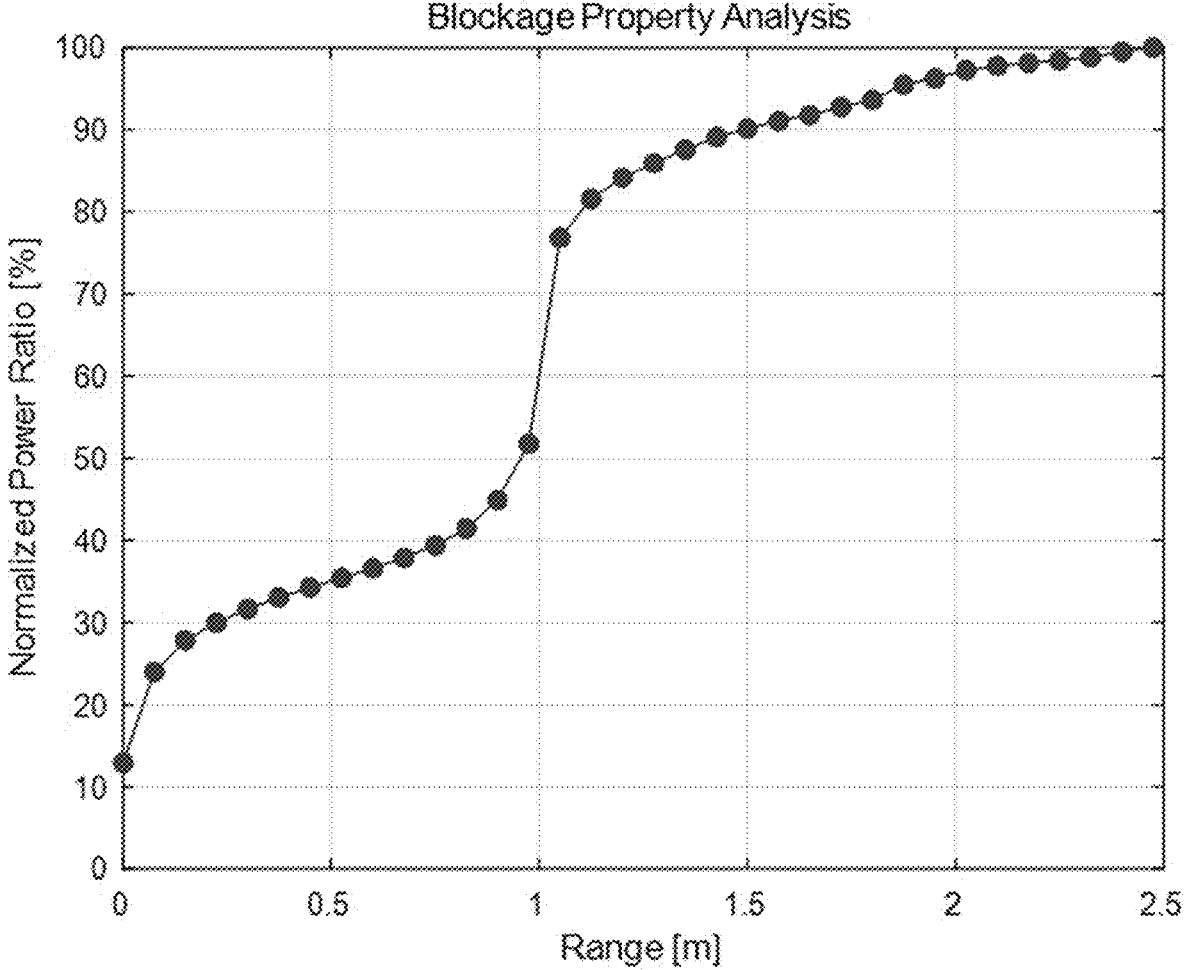

FIG. 9 is a graph showing an RDM signal characteristic in absence of blockage when a simulation target is arranged at about 1 m, and FIG. 10 is a graph showing an NPR of an RDM shown in FIG. 9.

As shown in FIG. 9, a near range leakage signal and a stationary simulation target present at a range of about 1 m were observed. In this case, as shown in FIG. 10, an NPR was about 30% at a near range where a leakage signal is present, that is, at about 0.25 m, and an NPR was about 60% at a range of about 1 m where a the simulation target is present.

Figure 11:
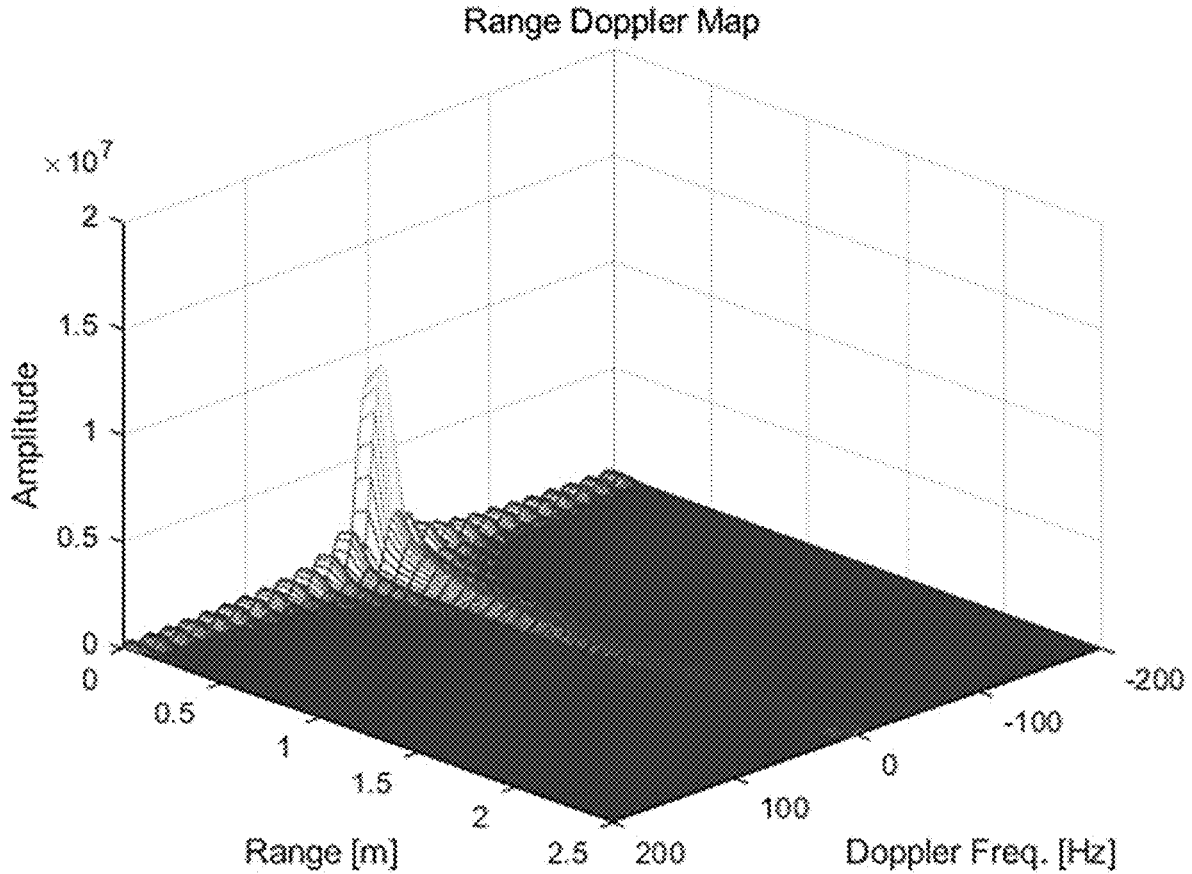
Figure 12:
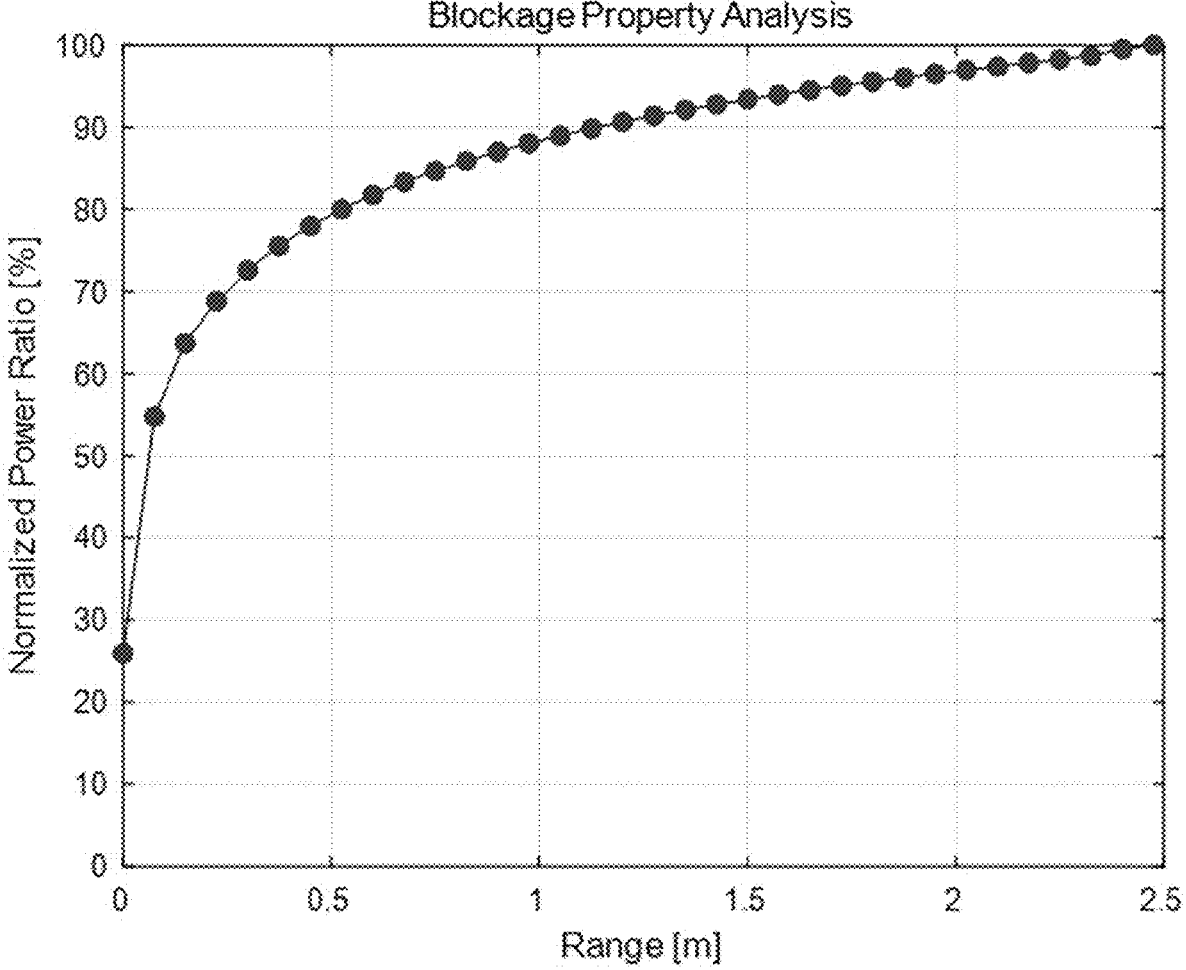

FIG. 11 is a graph showing an RDM signal characteristic in presence of blockage when a simulation target is arranged at about 1 m, and FIG. 12 is a graph showing an NPR of an RDM shown in FIG. 11.

As shown in FIG. 11, since blockage is present, an intensity of a near range leakage signal was increased, and a stationary simulation target was not present at a range of about 1 m due to blocking of radio waves.

In this case, as shown in FIG. 12, an NPR was about 70% at a near range where a leakage signal is present, that is, at about 0.25 m, and transmission/reception radio waves were blocked so that the simulation target is not present.

Figure 13:
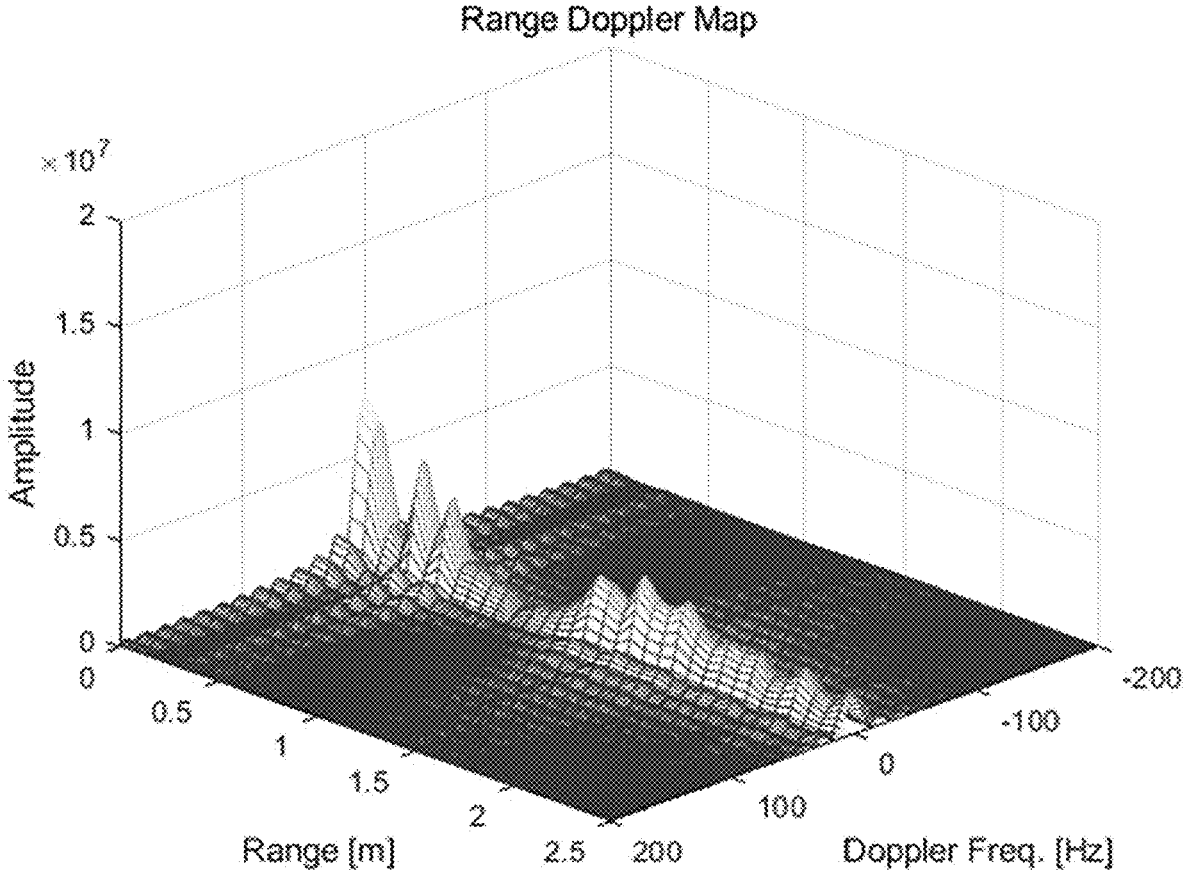
Figure 14:
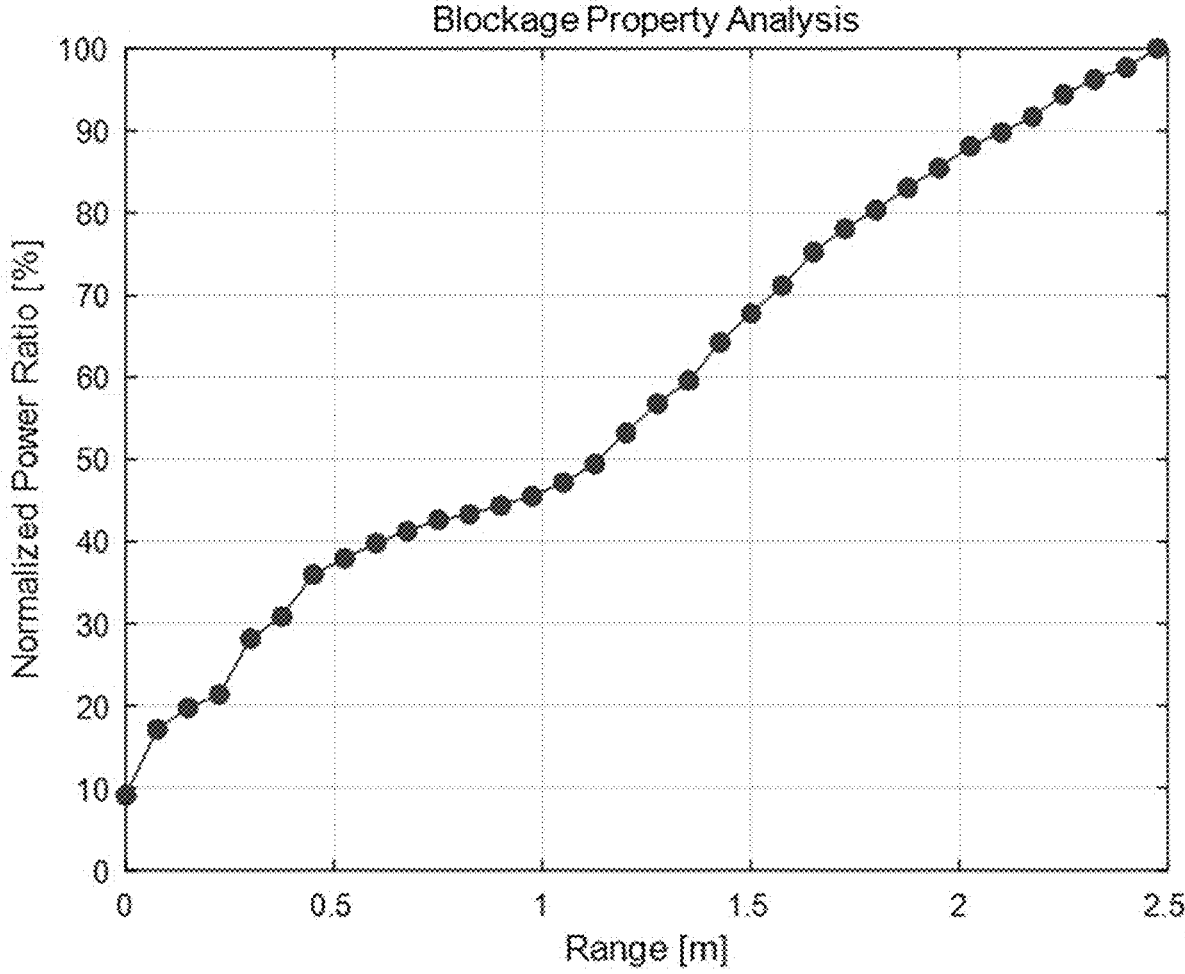

FIG. 13 is a graph showing an RDM signal characteristic in presence of a target and absence of blockage when a passenger detection radar system is mounted in a vehicle, and FIG. 14 is a graph showing an NPR of an RDM shown in FIG. 13.

As shown in FIG. 13, in presence of a stationary object such as a seat and a headrest and a living thing and absence of blockage in a vehicle interior environment, targets were present in all range bins in a zero Doppler region.

In this case, as shown in FIG. 14, an NPR was about 25% at a near range where a leakage signal is present, that is, at about 0.25 m.

Figure 15:
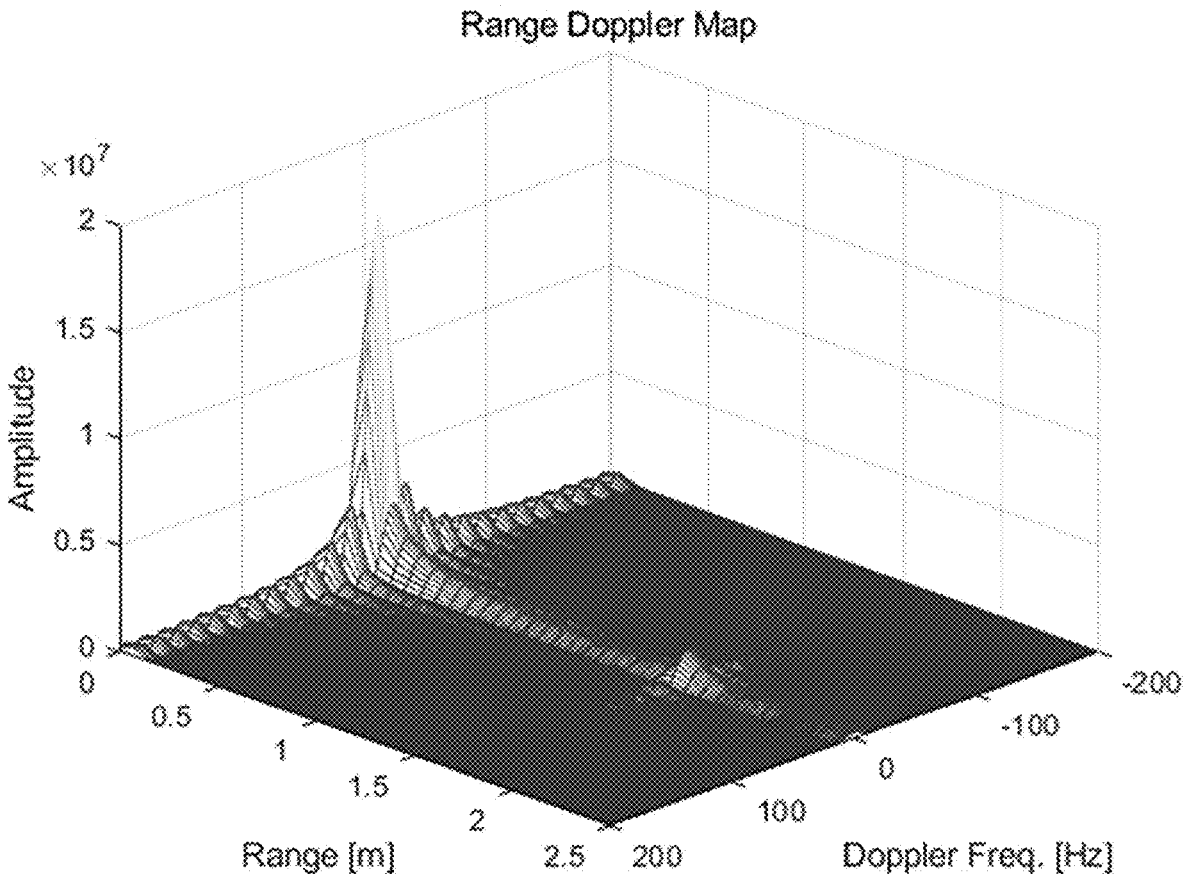
Figure 16:
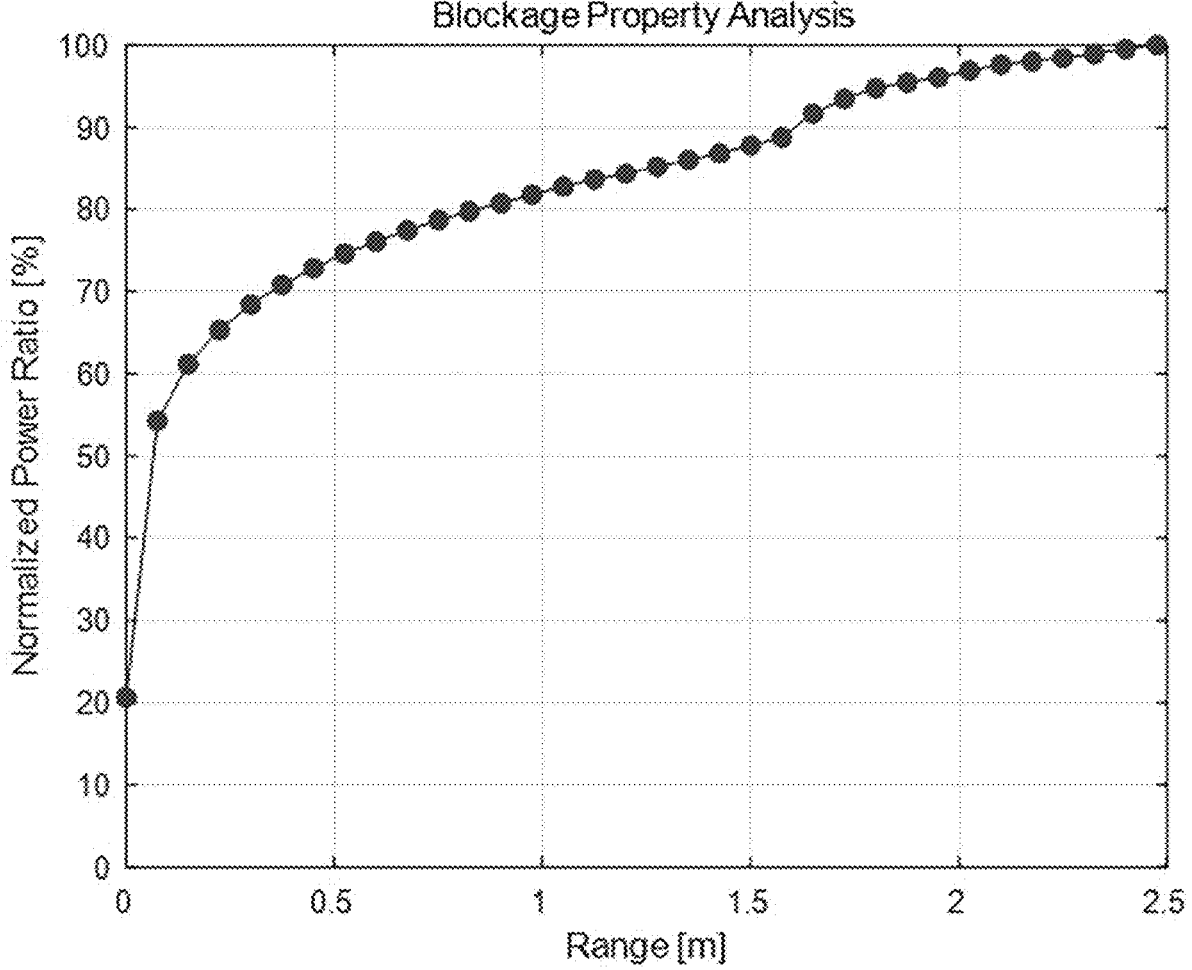

Meanwhile, FIG. 15 is a graph showing an RDM signal characteristic in presence of a target and absence of blockage when a passenger detection radar system is mounted in a vehicle, and FIG. 16 is a graph showing an NPR of an RDM shown in FIG. 15.

As shown in FIG. 15, in presence of a stationary object such as a seat and a headrest and a living thing and presence of blockage in a vehicle interior environment, the blockage interfered with propagation of a radar signal, so that all stationary objects and living things, that is, stationary targets and moving targets, present in the vehicle interior environment were not detected.

In this case, as shown in FIG. 16, an NPR was about 68% at a near range where a leakage signal is present, that is, at about 0.25 m. As described above, since the blockage is present, an intensity of the leakage signal was increased due to the blockage.

Through the process described above, according to the present invention, blockage that interferes with propagation of a radar signal for passenger detection may be detected to generate a warning alarm, so that a driver may take appropriate actions.

In other words, according to the present invention, presence or absence of the blockage may be detected based on a normalized power rate characteristic for zero Doppler data, a power value for a specific near range region may be detected, and a power characteristic of the specific near range region may be used to detect whether the blockage has occurred, so that a blockage detection error may be reduced.

Accordingly, according to the present invention, accuracy of a blockage detection result may be improved, a passenger detection error caused by the blockage may be prevented, and ultimately, a passenger detection rate may be improved.

Although the invention invented by the present inventor has been described in detail according to the above embodiments, the present invention is not limited to the embodiments, and various changes can be made without departing from the gist of the present invention.

The present invention may be applied to a technology for a passenger detection radar system and a blockage detection method therefor, in which blockage that interferes with propagation of a radar signal for passenger detection is detected to generate a warning alarm.

What is claimed is:

1. A passenger detection radar system for detecting a passenger by transmitting a radar signal toward a detection target and receiving a reception signal reflected from the detection target, the passenger detection radar system comprising:

a signal processing unit for receiving analog-to-digital converter (ADC) data, which is received through radar reception channels, and performing signal processing;

a range Doppler map (RDM) data unit for generating and storing RDM data based on a signal subjected to the signal processing;

a first detection unit for detecting normalized power rate (NPR) blockage based on an NPR by detecting a zero Doppler signal in which a Doppler frequency has a value of zero;

a second detection unit for detecting power blockage by detecting a power of the zero Doppler signal; and a blockage determination unit for making a final determination whether blockage has occurred based on detection results of the first and second detection units, and generating a control signal to generate a warning alarm upon determining presence of the blockage.

2. The passenger detection radar system of claim 1, wherein the signal processing unit includes:

an ADC data reception unit for receiving the ADC data;

a primary signal processing unit for performing primary signal processing on the received ADC data through one-dimensional fast Fourier transform (1D FFT) for a range; and a secondary signal processing unit for performing secondary signal processing on a signal subjected to the primary signal processing through two-dimensional fast Fourier transform (2D FFT) for a range and a Doppler frequency.

3. The passenger detection radar system of claim 1, wherein the first detection unit includes:

a zero Doppler detection unit for detecting a zero Doppler for the RDM data;

an NPR detection unit for detecting the NPR based on the detected zero Doppler, and an NPR blockage detection unit for detecting the NPR blockage based on the detected NPR, and the zero Doppler detection unit detects all range bin signals for one index of the zero Doppler, or detects all range bin signals for a frequency index section for a main lobe of the zero Doppler.

4. The passenger detection radar system of claim 3, wherein the NPR detection unit detects a total power for the detected zero Doppler, detects a sub-power as each range bin is increased for the detected zero Doppler, and calculates the NPR by using a ratio of the detected total power to the detected sub-power, and the NPR blockage detection unit applies a database, which is constructed by the NPR detection unit by storing NPR information with respect to a temperature variation in absence of the blockage in a table, as a reference, and compares an NPR reference value with the detected NPR at a specific near range to detect the NPR blockage.

5. The passenger detection radar system of claim 3, wherein the second detection unit includes:

a zero Doppler power detection unit for detecting a zero Doppler power for the RDM data; and a power blockage detection unit for detecting the power blockage based on the detected zero Doppler power, and the zero Doppler power detection unit measures a power for a specific range and a specific frequency region in the RDM data.

6. The passenger detection radar system of claim 5, wherein the power blockage detection unit constructs a database by storing leakage signal variation information with respect to a temperature variation in absence of the blockage in a table to measure a power of the RDM data in the absence of the blockage and apply the power of the RDM data as a leakage signal level reference, the power blockage detection unit sets a blockage power threshold level based on the leakage signal level reference and the leakage signal variation information stored in the table, and the power blockage detection unit compares a power measurement value of the RDM data with the blockage power threshold level to detect the power blockage.

7. The passenger detection radar system of claim 1, further comprising:

a communication unit for communicating with a control module provided in a vehicle in a wired or wireless communication scheme, wherein the communication unit transmits blockage detection result information to the control module when the blockage determination unit determines that the blockage has occurred.

8. A blockage detection method for a passenger detection radar system for detecting a passenger by transmitting a radar signal toward a detection target and receiving a reception signal reflected from the detection target, the blockage detection method comprising:

(a) receiving, by a signal processing unit, analog-to-digital converter (ADC) data, which is received through radar reception channels, and performing signal processing;

(b) generating and storing, by a range Doppler map (RDM) data unit, RDM data subjected to the signal processing;

(c) detecting, by a first detection unit, normalized power rate (NPR) blockage based on an NPR by detecting a zero Doppler signal in which a Doppler frequency has a value of zero;

(d) detecting, by a second detection unit, power blockage by detecting a power of the zero Doppler signal; and (e) making, by a blockage determination unit, a final determination whether blockage has occurred based on detection results of the first and second detection units, and generating a warning alarm upon determining presence of the blockage.

9. The blockage detection method of claim 8, wherein the step (a) includes:

(a1) receiving, by an ADC data reception unit, the ADC data;

(a2) performing, by a primary signal processing unit, primary signal processing on the received ADC data through one-dimensional fast Fourier transform (1D FFT) for a range; and (a3) performing, by a secondary signal processing unit, secondary signal processing on a signal subjected to the primary signal processing through two-dimensional fast Fourier transform (2D FFT) for a range and a Doppler frequency.

10. The blockage detection method of claim 8, wherein the step (c) includes:

(c1) detecting, by a zero Doppler detection unit provided in the first detection unit, a zero Doppler for the RDM data;

(c2) detecting, by an NPR detection unit, the NPR based on the detected zero Doppler; and (c3) detecting, by an NPR blockage detection unit, the NPR blockage based on the detected NPR, and, in the step (c1), the zero Doppler detection unit detects all range bin signals for one index of the zero Doppler, or detects all range bin signals for a frequency index section for a main lobe of the zero Doppler.

11. The blockage detection method of claim 10, wherein, in the step (c2), the NPR detection unit detects a total power for the detected zero Doppler, detects a sub-power as each range bin is increased for the detected zero Doppler, and calculates the NPR by using a ratio of the detected total power to the detected sub-power, and, in the step (c3), the NPR blockage detection unit applies a database, which is constructed by the NPR detection unit by storing NPR information with respect to a temperature variation in absence of the blockage in a table, as a reference, and compares an NPR reference value with the detected NPR at a specific near range to detect the NPR blockage.

12. The blockage detection method of claim 10, wherein the step (d) includes:

(d1) detecting, by a zero Doppler power detection unit provided in the second detection unit, a zero Doppler power for the RDM data; and (d2) detecting, by a power blockage detection unit, the power blockage based on the detected zero Doppler power, and, in the step (d1), the zero Doppler power detection unit measures a power for a specific range and a specific frequency region in the RDM data.

13. The blockage detection method of claim 12, wherein, in the step (d2), the power blockage detection unit constructs a database by storing leakage signal variation information with respect to a temperature variation in absence of the blockage in a table to measure a power of the RDM data in the absence of the blockage and apply the power of the RDM data as a leakage signal level reference, the power blockage detection unit sets a blockage power threshold level based on the leakage signal level reference and the leakage signal variation information stored in the table, and the power blockage detection unit compares a power measurement value of the RDM data with the blockage power threshold level to detect the power blockage.

14. The blockage detection method of claim 8, further comprising:

(f) transmitting blockage detection result information to a control module through a communication unit, which communicates with the control module provided in a vehicle in a wired or wireless communication scheme, when the blockage determination unit determines that the blockage has occurred in the step (e).

* * * * *